(12) United States Patent
Logue et al.

(10) Patent No.: US 7,627,635 B1
(45) Date of Patent: Dec. 1, 2009

(54) MANAGING SELF-ADDRESSED ELECTRONIC MESSAGES

(75) Inventors: Jay Logue, San Jose, CA (US); Jeffrey N. Heiner, Los Altos, CA (US); Phillip York Goldman, Los Altos, CA (US); Susan Rayl Goldman, legal representative, Los Altos, CA (US)

(73) Assignee: AOL LLC, Dulles, VA (US)

( * ) Notice: Subject to any disclaimer, the term of this patent is extended or adjusted under 35 U.S.C. 154(b) by 703 days.

(21) Appl. No.: 10/900,657

(22) Filed: Jul. 28, 2004

Related U.S. Application Data

(60) Provisional application No. 60/490,850, filed on Jul. 28, 2003.

(51) Int. Cl.
    *G06F 15/16* (2006.01)
(52) U.S. Cl. .................. 709/206; 709/207
(58) Field of Classification Search .......... 709/206–207
    See application file for complete search history.

(56) References Cited

U.S. PATENT DOCUMENTS

| | | |
|---|---|---|
| 4,977,520 A | 12/1990 | McGaughey, III et al. |
| 5,040,141 A | 8/1991 | Yazima et al. |
| 5,093,918 A | 3/1992 | Heyen et al. |
| 5,159,673 A | 10/1992 | Sackmann et al. |
| 5,204,961 A | 4/1993 | Barlow |
| 5,245,532 A | 9/1993 | Mourier |
| 5,283,856 A | 2/1994 | Gross et al. |
| 5,319,776 A | 6/1994 | Hile et al. |
| 5,333,266 A | 7/1994 | Boaz et al. |
| 5,377,354 A | 12/1994 | Scannell et al. |
| 5,423,042 A | 6/1995 | Jalili et al. |
| 5,448,734 A | 9/1995 | Hrabik et al. |
| 5,471,519 A | 11/1995 | Howe et al. |
| 5,473,671 A | 12/1995 | Partridge, III |
| 5,539,828 A | 7/1996 | Davis |
| 5,548,789 A | 8/1996 | Nakanura |
| 5,600,799 A | 2/1997 | Young et al. |
| 5,604,803 A | 2/1997 | Aziz |

(Continued)

FOREIGN PATENT DOCUMENTS

| | | |
|---|---|---|
| DE | 19708856 | 9/1998 |

(Continued)

OTHER PUBLICATIONS

NAGS Spam Filter [online], Oct. 30, 1997. Retrieved from the Internet http://www.nags.org/spamfilter.html, pp. 1-11.

(Continued)

*Primary Examiner*—William C Vaughn, Jr.
*Assistant Examiner*—Maceeh Anwari
(74) *Attorney, Agent, or Firm*—Workman Nydegger

(57) ABSTRACT

A system may include an electronic messaging system that may access user identifier information, which may be used to identify self-addressed electronic messages. The electronic messaging system may determine how to process an incoming electronic message using at least a portion of the user identifier information. The electronic messaging system determines whether to send a challenge-response message to a sender of an electronic message using at least a portion of the user identifier information. The electronic messaging system may be configured to identify self-addressed electronic messages and, in response to such identification, process the messages appropriately.

6 Claims, 10 Drawing Sheets

U.S. PATENT DOCUMENTS

| | | | |
|---|---|---|---|
| 5,608,786 A | 3/1997 | Gordon |
| 5,619,648 A | 4/1997 | Canale et al. |
| 5,627,764 A | 5/1997 | Schutzman et al. |
| 5,630,123 A | 5/1997 | Hogge |
| 5,632,018 A | 5/1997 | Otorii |
| 5,655,079 A | 8/1997 | Hirasawa et al. |
| 5,721,779 A | 2/1998 | Funk |
| 5,734,903 A | 3/1998 | Saulpaugh et al. |
| 5,742,668 A | 4/1998 | Pepe et al. |
| 5,742,769 A | 4/1998 | Lee et al. |
| 5,781,857 A | 7/1998 | Hwang et al. |
| 5,796,840 A | 8/1998 | Davis |
| 5,826,022 A | 10/1998 | Nielsen |
| 5,832,227 A | 11/1998 | Anderson et al. |
| 5,835,722 A | 11/1998 | Bradshaw et al. |
| 5,859,967 A | 1/1999 | Kaufeld et al. |
| 5,884,033 A | 3/1999 | Duvall et al. |
| 5,893,911 A | 4/1999 | Piskiel et al. |
| 5,909,589 A | 6/1999 | Parker et al. |
| 5,917,489 A | 6/1999 | Thurlow et al. |
| 5,930,479 A | 7/1999 | Hall |
| 5,937,162 A | 8/1999 | Funk et al. |
| 5,999,600 A | 12/1999 | Shin |
| 5,999,932 A | 12/1999 | Paul |
| 5,999,967 A | 12/1999 | Sundsted |
| 6,014,634 A | 1/2000 | Scroggie et al. |
| 6,023,723 A | 2/2000 | McCormick et al. |
| 6,052,709 A | 4/2000 | Paul |
| 6,055,510 A | 4/2000 | Henrick et al. |
| 6,057,841 A | 5/2000 | Thurlow et al. |
| 6,073,142 A | 6/2000 | Geiger et al. |
| 6,092,101 A | 7/2000 | Birrell et al. |
| 6,112,227 A | 8/2000 | Heiner |
| 6,154,765 A | 11/2000 | Hart |
| 6,173,322 B1 | 1/2001 | Hu |
| 6,182,118 B1 | 1/2001 | Finney et al. |
| 6,189,026 B1 | 2/2001 | Birrell et al. |
| 6,195,698 B1 | 2/2001 | Lillibridge et al. |
| 6,199,102 B1 | 3/2001 | Cobb |
| 6,199,106 B1 | 3/2001 | Shaw et al. |
| 6,205,432 B1 | 3/2001 | Gabbard et al. |
| 6,226,372 B1 | 5/2001 | Beebe et al. |
| 6,230,188 B1 | 5/2001 | Marcus |
| 6,237,027 B1 | 5/2001 | Namekawa |
| 6,249,807 B1 | 6/2001 | Shaw et al. |
| 6,266,692 B1 | 7/2001 | Greenstein |
| 6,282,565 B1 | 8/2001 | Shaw et al. |
| 6,349,328 B1 | 2/2002 | Haneda et al. |
| 6,356,935 B1 | 3/2002 | Gibbs |
| 6,366,950 B1 | 4/2002 | Scheussler et al. |
| 6,373,950 B1 | 4/2002 | Rowney |
| 6,393,465 B2 | 5/2002 | Leeds |
| 6,421,709 B1 | 7/2002 | McCormick et al. |
| 6,457,044 B1 | 9/2002 | IwaZaki |
| 6,460,074 B1 | 10/2002 | Fishkin |
| 6,484,197 B1 | 11/2002 | Donohue |
| 6,546,416 B1 | 4/2003 | Kirsch |
| 6,587,550 B2 | 7/2003 | Council et al. |
| 6,625,257 B1 | 9/2003 | Asaoka et al. |
| 6,640,301 B1 | 10/2003 | Ng |
| 6,671,718 B1 | 12/2003 | Meister et al. |
| 6,678,704 B1 | 1/2004 | Bridge, Jr. et al. |
| 6,691,156 B1 | 2/2004 | Drummond et al. |
| 6,708,205 B2 | 3/2004 | Sheldon et al. |
| 6,748,422 B2 | 6/2004 | Morin et al. |
| 6,868,498 B1 | 3/2005 | Katsikas |
| 6,883,095 B2 | 4/2005 | Sandhu et al. |
| 7,043,753 B2 | 5/2006 | Roddy et al. |
| 7,076,533 B1 | 7/2006 | Knox et al. |
| 7,085,925 B2 | 8/2006 | Hanna et al. |
| 7,120,927 B1 | 10/2006 | Beyda et al. |
| 7,136,897 B1 | 11/2006 | Raghunandan |
| 7,185,194 B2 | 2/2007 | Morikawa et al. |
| 7,188,358 B1 | 3/2007 | Hisada et al. |
| 7,383,433 B2 | 6/2008 | Yeager et al. |
| 2002/0042815 A1 | 4/2002 | Salzfass et al. |
| 2002/0046099 A1 | 4/2002 | Frengut et al. |
| 2002/0046250 A1 | 4/2002 | Nassiri |
| 2002/0099781 A1 | 7/2002 | Scheussler et al. |
| 2002/0107856 A1 | 8/2002 | Scheussler et al. |
| 2002/0116641 A1 | 8/2002 | Mastrianni |
| 2002/0147726 A1 | 10/2002 | Yehia et al. |
| 2002/0194308 A1 | 12/2002 | Hall |
| 2002/0199095 A1 | 12/2002 | Bandini et al. |
| 2003/0009698 A1 | 1/2003 | Lindeman et al. |
| 2003/0023736 A1 | 1/2003 | Abkemeier |
| 2003/0037250 A1 | 2/2003 | Walker et al. |
| 2003/0065926 A1 | 4/2003 | Schultz et al. |
| 2003/0081621 A1 | 5/2003 | Godfrey et al. |
| 2003/0086543 A1 | 5/2003 | Raymond |
| 2003/0097597 A1 | 5/2003 | Lewis |
| 2003/0110400 A1 | 6/2003 | Cartmell et al. |
| 2003/0163691 A1 | 8/2003 | Johnson |
| 2003/0167311 A1 | 9/2003 | Kirsch |
| 2003/0167402 A1 | 9/2003 | Stolfo et al. |
| 2003/0191969 A1 | 10/2003 | Katsikas |
| 2003/0196116 A1 | 10/2003 | Troutman |
| 2003/0200267 A1 | 10/2003 | Garrigues |
| 2003/0233418 A1 | 12/2003 | Goldman |
| 2003/0236847 A1 | 12/2003 | Benowitz et al. |
| 2004/0015554 A1* | 1/2004 | Wilson ................. 709/206 |
| 2004/0054887 A1 | 3/2004 | Paulsen, Jr. et al. |
| 2004/0087300 A1 | 5/2004 | Lewis |
| 2004/0111480 A1* | 6/2004 | Yue ...................... 709/206 |
| 2004/0143633 A1 | 7/2004 | McCarty |
| 2004/0148358 A1 | 7/2004 | Singh et al. |
| 2004/0167941 A1 | 8/2004 | Prahlad et al. |
| 2004/0181581 A1 | 9/2004 | Kosco |
| 2004/0199595 A1 | 10/2004 | Banister et al. |
| 2005/0081059 A1 | 4/2005 | Bandini et al. |
| 2005/0188045 A1 | 8/2005 | Katsikas |
| 2006/0112165 A9 | 5/2006 | Tomkow et al. |

FOREIGN PATENT DOCUMENTS

| | | |
|---|---|---|
| EP | 0463252 | 1/1992 |
| EP | 0651533 | 5/1995 |
| EP | 0686327 | 12/1995 |
| EP | 0721268 | 7/1996 |
| EP | 0725523 | 8/1996 |
| EP | 0760565 | 7/1998 |
| EP | 0883271 | 12/1998 |
| WO | 94/06236 | 3/1994 |
| WO | 96/09714 | 3/1996 |
| WO | 96/24213 | 8/1996 |
| WO | 97/14234 | 4/1997 |
| WO | 97/20423 | 6/1997 |
| WO | 97/23082 | 6/1997 |
| WO | 97/24825 | 7/1997 |
| WO | 97/26709 | 7/1997 |
| WO | 98/37675 | 8/1998 |
| WO | WO99/10817 | 3/1999 |
| WO | 01/16695 | 3/2001 |
| WO | 02/077768 | 10/2002 |
| WO | 03/044617 | 5/2003 |

OTHER PUBLICATIONS

Document entitled "IMAP/POP Authorize Extension for Simple Challenge/Response," dated Sep. 1997, by J. Klensin, R. Catoe, P. Krumviede (5 pages).

Unsolicited Bulk Email: Mechanisms for Control, by Paul Hoffman and Dave Crocker, Internet Mail Consortium Report UBE-SOL, IMCR-008, revised May 4, 1998, pp. 1-16.

Unsolicited Bulk Email: Mechanisms for Control, by Paul Hoffman and Dave Crocker, Internet Mail Consortium Report UBE-SOL, IMCR-005, Oct. 13, 1997, pp. 1-31.

Controlling E-Mail Spam [online] [retrieved on Mar. 28, 2003]. Retrieved from the Internet http://spam.abuse.net/adminhelp/mail.shtml, pp. 1-5.

The Penny Black Project [online] [retrieved on May 8, 2006]. Retrieved from the Internet http://research.microsoft.com/research/sv/PennyBlack/, pp. 1-2.

Article entitled "Verification of a Human in the Loop or Identification Via the Turing Test," dated Sep. 13, 1996, by Moni Naor, Department of Applied Mathematics and Computer Science, Weizmann Institute of Science (6 pages).

Article entitled "Pricing Via Processing or Combatting Junk Mail," by Cynthia Dwork and Moni Naor, IBM Research Division and Department of Applied Mathematics and Computer Science, Weizmann Institute of Science (12 pages).

A Way to Stop Spam Messages [online] [retrieved on Apr. 25, 2003]. Retrieved from the Internet http://groups.google.com/groups?q=%B%22sender%22+%2Bspam&start=10&hl=en&lr..., pp. 1-4.

My Spamblock; Was: Thwarting UCE address culling programs [online] [retrieved on Apr. 28, 2003]. Retrieved from the Internet http://www.google.com/groups?hl=en&lr=Iie=UTF-8&oe=UTF-8&selm=32E1A4FD.41C..., pp. 1-2.

Aguilar, Rose, AOL fights to ban junk, CNETNews.com, Sep. 6, 1996, 3 pages, http://www.news.com/News/Item/0.43106,00.html.

Andrew Leonard, SpamBomers, Sep. 1997, 7 pages, Salon Magazine+about 21st+newsletter.

Cementing Online Partnerships and Improving User Experience, RSA Security, retrived online May 17, 2006, 7 pages, www.rsasecurity.com.

Chinese Abstract for CN 1117680, published Feb. 28, 1996.

CNET News.com staff, ISP: Internet Spam Provider, Feb. 18, 1997, 2 pages, CNET News.com.

Cole-Gomolski, Barb, Adoption of S/MIME still lagging, May 11, 1998, 4 pages, http://www.computerworld.com/home/features.nsf/....

Cynthia Dwork, Fighting Spam May be Easier Than You Think, 1992, 30 pages, presentation given in Crypto.

Cynthia Dwork, Fighting Spam: The Science, 2004, pp. 3-4, M. Farach-Colton (Ed.): Latin 2004, LNCS 2976, Springer-Verlag Berlin.

D.J. Berstein, Variable Envelope Return Paths, Feb. 1, 1997, 2 pages, http://cr.yp.to/proto/verp.txt.

David A. Wheeler, Countering Spam with Ham-Authenticated Email and the Guarded Email Protocol, Draft: First version Dec. 8, 2002; Released Apr. 2, 2003, 28 pages, dwheeler@dwheeler.com.

David F. Skoll, How to make sure a human is sending you mail (was Re: Random e-mails), Nov. 15, 2006, 2 pages, news.admin.net-abuse.usenet, http://groups.google.com/group/news.admin.net-abuse.usenet/msg/e601783e8f40c54?d....

Dealing with Unsolicited Commercial Email (UCE, "email spam"), 2005 Public Access Networks Corporation, online, retrieved on Jun. 6, 2006, 3 pages, retrieved from the Internet http://www.panix.com/uce.html, Copyright 2003.

Douglas G. Henke, All Hail Emperor Lewis?, online, Feb. 20, 1997, 2 pages, retrived Apr. 25, 2003, retrived from the internet http://groups.google.com/groups.

Ed Foster, The Gripe Line Threatening legal action may be the quickeest way off a junk e-mailer's list, Info World Info Quote, Sep. 9, 1996, 2 pages, vol. 18, Issue 37, http://www.infoworld.com/egi-bin/siplayArchives.pl?....

Foiling Spam with an Email Password System, online,retrieved on Jun. 28, 2004, 10 pages, retrieved from the Internet, http://www.uwasa.fi/~ts/info/spamfoil.html.

Jameson, Bob, Filter for mail not addressed to you, Jesse Berst's Anchor Desk, Sep. 6, 1996, 3 pages, http://www.news.com/News/Item/0.43106,00.html.

Janet Kornblum, Programmer Writes Spam Bomb, Aug. 6, 1997, 2 pages, CNET News.com.

Julian Byrne, New Improved EZSPAM! Was: My Spamblock . . . , online, Jan. 28, 1997, 4 pages, retrieved Apr. 25, 2003, retrived from the internet, http://groups.google.com/groups.

Lorrie Faith Crano et al, Spam!, Aug. 1998, pp. 74-83, Communications of the ACM, vol. 41, No. 8.

MailCircuit's Email HandShake Verification and Spam Filter Process, online, copyright 1996-2003, 2 pages, MailCircuit.com, retrieved from the Internet http://www.mailcircuit.com/filter.htm.

Michael's Stop Junk E-Mail, Stop Junk E-mail, Nov. 17, 1996, 2 pages, http://www.crl.com/-michaelp/stopjunkmail.html.

Mihir Bellare et al., Does Parallel Repetition Lower the Error in Computationally Sound Protocols?, 1997, 24 pages, Proceedings of the 38th Symposium on Foundations of Computer Science, IEEE.

MIT LCS, Applied Security Reading Group, by Email Sit and Kevin Fu, 2 pages, updated May 5, 2003 on the Internet http://www.pdocs.lcs.mit.edu/asrg/.

P. Resnick, RFC28822, Apr. 2001, 51 pages, Qualcom Incorporated, http:rfc.net/rfc2822.html.

Public Access Networks Corporation, Responding to Unsolicited Commercial Email (UCE, "email spam"), Feb. 25, 1997, 5 pages, http:www.panix.com/uce.html.

Showing Full Headers of a Message, Nov. 6, 1998, 3 pages, http://www.panix.com/headers.html.

Tim Richardson, Simple Notes on Internet Security and Email, Jun. 28, 1999, 2 pages, http://www.timrichardson.net/security.html.

Ronald F. Guilmette, To Mung or Not to Mung, online, Jul. 24, 1997, 2 pages, retrieved Apr. 25, 2003, retrieved from the internet http://groups.google.com/groups.

* cited by examiner

MANAGING SELF-ADDRESSED ELECTRONIC MESSAGES

CROSS-REFERENCE TO RELATED APPLICATIONS

This application claims priority to and the benefit of U.S. Provisional Patent Application Ser. No. 60/490,850, entitled ACCOMMODATING SELF-ADDRESSED MAIL IN A CHALLENGE-RESPONSE SYSTEM and filed on Jul. 28, 2003. The foregoing application is hereby incorporated herein by reference.

BACKGROUND

1. The Field of the Invention

The present invention relates generally to electronic messaging. More specifically, the present invention relates to systems and methods for managing the delivery of electronic messages.

2. Background Technology

Many people and businesses have found electronic messaging, such as e-mailing and instant messaging, a convenient method of communication because sending and receiving electronic messages can be easy.

Unfortunately, the ease with which electronic messages may be generated and sent has led to the development of unsolicited bulk electronic messages, better known as "spam." Unsolicited electronic messages come from a large spectrum of different sources and often include commercial advertisements, political messaging, and other undesirable content including pornographic solicitations.

To many users, it seems that the number of unsolicited messages that they receive increases daily. Receiving unsolicited electronic messages is frustrating for many users because they must sort through each electronic message they receive. If they do not sort through their messages regularly, the number of unsolicited electronic messages may soon outnumber the desired electronic messages and make it difficult for a user to find certain electronic messages. Users are understandably frustrated that they must waste time sorting through unsolicited electronic messages that they receive daily. Even if simply deleting the unsolicited electronic messages, users can waste significant amounts of time.

For these reasons, users need a way to successfully prevent unwanted or unsolicited electronic messages from being delivered. Some attempts have been made to allow users to filter out unwanted and/or unsolicited electronic messages. One of the most successful methods for preventing the delivery of unwanted e-mail involves delivering e-mail only after a challenge-response process has been successfully completed. In one conventional challenge-response process, a recipient e-mail server, upon receiving an e-mail message from a sender, transmits a challenge message to the sender. The challenge message is designed to be answered manually by a person, rather than automatically by a computer or machine. For example, a challenge message could ask the sender to perform some action by providing input that may be easily done by a person, but that may not be easily done by a computer. Accordingly, because it is impractical for bulk-mailers to personally respond to challenge messages, such senders typically cannot complete the challenge-response process. Thus, because the challenge-response process is not completed, the bulk unsolicited electronic message is not delivered.

While conventional challenge-response processes have successfully reduced unsolicited e-mail, they have not been able to respond well in situations in which an attempt is made by a user to send an e-mail to himself or herself. A person may wish to send a self-addressed e-mail for a variety of reasons. In some situations, a person may have multiple e-mail addresses and/or associated e-mail accounts (such as a work e-mail account, a personal e-mail account, and the like) among which a person may wish to send e-mail. For example, rather than coming to their workplace on a weekend to revise an electronic file (such as a MICROSOFT WORD™ document), persons may wish to e-mail that electronic file from their work e-mail account to a personal e-mail account that is accessible from home, allowing the person to retrieve and revise the electronic file at home. Also, when at home, persons may remember an important commitment and may send a reminder e-mail from their personal e-mail account to their work e-mail account, allowing them to see the reminder after returning to their workplace.

A person may wish to send a self-addressed e-mail to maintain a historical record of e-mail. For example, some e-mail systems will store a large number of incoming messages, but will only store a relatively limited number of outgoing or "sent" messages. Thus, after a certain number of sent messages is reached, these e-mail systems will automatically delete the oldest sent messages without prompting a user. Accordingly, with such systems, users may add their e-mail address to the list of recipients of an e-mail so that the users will receive a copy of the e-mail as an incoming message—which is less likely to be automatically deleted. As a further example, some websites provide a form into which a user may send an e-mail by entering the user's e-mail address into a "From:" field and a recipient's e-mail address into a "To:" field. Such websites typically offer to forward a copy of the e-mail to the e-mail address in the "From:" field—allowing the user to receive a copy for the user's personal records. Of course, a person may wish to send a self-addressed e-mail for a variety of other reasons.

Whatever a person's reason for sending a self-addressed e-mail may be, the person will not want to receive a challenge message in response to sending an e-mail to himself or herself. Indeed, receiving such challenge messages may be frustrating and confusing for the person—who may not understand why a challenge message has been sent in this context. Further, such challenge messages may waste the resources of the person's recipient e-mail system and the resources of the person's sender e-mail system.

Equally frustrating and confusing situations may arise from spam e-mail having a "spoofed" sender's e-mail address. "Spoofing" includes the practice of making an electronic message (such as an e-mail) falsely appear to come from a particular sender (such as an e-mail address). For example, spammers may send (to a recipient's e-mail address) a spam e-mail that appears to come from the recipient's e-mail address. In response to receiving this spam email, a challenge-response system may send a challenge message to the apparent sender of the message—that is, the recipient. When receiving a challenge message in this situation, a recipient may be confused because the recipient will not remember sending the particular e-mail associated with the challenge message. After wasting the effort to respond to the challenge message, the person may be especially frustrated to learn that the message is merely spam.

SUMMARY

Embodiments of the invention relate to systems and methods for accommodating self-addressed electronic messages in challenge-response messaging systems. Embodiments of the invention also relate to systems and methods for determining whether an IP address associated with a sender's server is recognized as being a legitimate server. In these embodiments, incoming electronic messages that are determined to be validly self-addressed or to have been sent by a recognized legitimate server are delivered without subjecting the sender to a challenge message.

In one embodiment, an electronic messaging system may access user identifier information to make decisions regarding how to process incoming electronic messages, such as, for example, whether a challenge-response process should be initiated, whether an electronic message should be delivered, how an electronic message should be delivered, whether an electronic message should be delayed, whether an electronic message should be deleted, or the like. The electronic messaging system may access any other suitable information to make decisions regarding how to process incoming electronic messages.

The user identifier information may include one or more data structures adapted to help determine whether an electronic message is self-addressed. In one embodiment, a data structure may describe a recipient identifier associated with an electronic message and/or a sender identifier associated with an electronic message. For example, the data structure may indicate that a sender identifier and/or a recipient identifier is associated with an external account from which the electronic messaging system may retrieve electronic messages, associated with a forwarding account from which electronic messages are automatically forwarded to the electronic messaging system, hosted by the electronic messaging system, a main or primary e-mail address hosted by the electronic messaging system, a secondary address hosted by the electronic messaging system, a derived address hosted by the electronic messaging system, and/or an alias hosted by the electronic messaging system, and the like. Of course, the user identifier information may be organized in any other suitable form and may comprise other suitable information.

In one embodiment, electronic messaging system may receive an electronic message, receive a sender identifier associated with the electronic message, receive a recipient identifier associated with the electronic message, determine whether to issue a challenge-response process, including determining whether the sender identifier and the recipient identifier indicate that the electronic message is a self-addressed electronic message.

For purposes of summarizing, some aspects, advantages, and novel features have been described. Of course, it is to be understood that not necessarily all such aspects, advantages, or features will be embodied in any particular embodiment of the invention. Further, embodiments of the invention may comprise aspects, advantages, or features other than those that have been described.

Some aspects, advantages, or features of embodiments of the invention may become more fully apparent from the following description and appended claims or may be learned by the practice of embodiments of the invention as set forth in this disclosure.

BRIEF DESCRIPTION OF THE DRAWINGS

To further clarify the above and other advantages and features of embodiments of the present invention, a more particular description will be rendered by reference to specific embodiments thereof which are illustrated in the appended drawings. It is appreciated that these drawings depict only typical embodiments of the invention and are therefore not to be considered limiting of its scope. Certain embodiments of the invention will be described and explained with additional specificity and detail through the use of the accompanying drawings in which.

DETAILED DESCRIPTION OF THE PREFERRED EMBODIMENTS

Figure 1A:
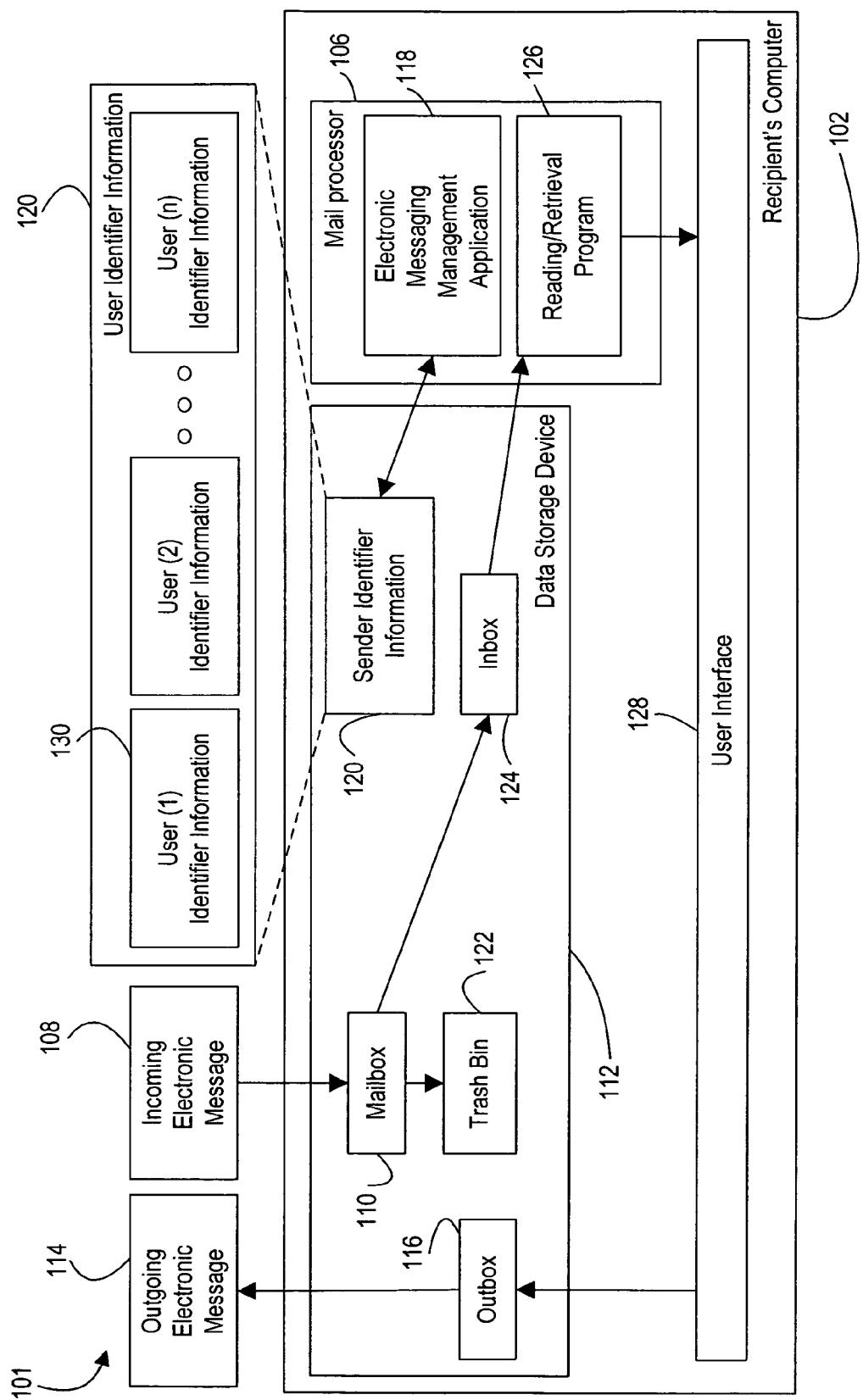
FIG. 1A is block diagram illustrating an exemplary embodiment of an electronic messaging system.

Embodiments of the present invention can reduce the number of unsolicited or unwanted electronic messages received by recipients, while helping to reduce some confusion and frustration that might otherwise be expected from certain electronic messaging systems, such as those employing a challenge-response process.

I. Overview of Challenge-Response Systems and Self-Addressed Messages

The following discussion presents general concepts associated with challenge-response systems. As described in greater detail below, embodiments of the invention relate to methods for adapting such challenge-response systems to substantially avoid sending challenges in response to self-addressed electronic messages. A typical challenge-response process requires one or more responses before an electronic message is delivered to an intended recipient. For example, in one embodiment of a challenge-response process, an electronic messaging system initiates a challenge-response process by sending one or more challenge messages to a sender of the electronic message. If the electronic messaging system receives a satisfactory response, the electronic message is delivered to the intended recipient or is otherwise processed in any other suitable manner. If the electronic messaging system does not receive a satisfactory response, the electronic message is deleted or otherwise processed in any other suitable manner.

Exemplary embodiments of some challenge-response processes, protocols, and/or systems are described in U.S. Pat. No. 6,199,102, entitled METHOD AND SYSTEM FOR FILTERING ELECTRONIC MESSAGES; U.S. Pat. No. 6,112,227, entitled FILTER-IN METHOD FOR REDUCING JUNK E-MAIL; and U.S. patent application Ser. No. 10/174,561, entitled PRACTICAL TECHNIQUES FOR REDUCING UNSOLICITED ELECTRONIC MESSAGES BY IDENTIFYING SENDER'S ADDRESSES and filed Jun. 18, 2002, each of which is hereby incorporated by reference herein.

Not surprisingly, challenge-response processes help reduce the number of unsolicited electronic messages that a person receives because proper responses require substantial human and/or system resources. Despite their advantages, conventional challenge-response processes can be unnecessarily burdensome in certain situations.

For example, a person may wish to send a self-addressed electronic message. Self-addressed electronic messages include messages between, among, or otherwise associated with any combination of one or more of the person's electronic messaging accounts and/or one or more recipient identifiers associated with any of the person's electronic messaging accounts.

A sender of a self-addressed electronic message may be confused and frustrated if the sender receives a challenge-response message in response to sending the self-addressed electronic message.

It will be appreciated that a person may have one or more electronic messaging accounts (such as an e-mail account) and each electronic message account may have one or more associated recipient identifiers (such as an e-mail address). For example, a person may have access one or more electronic messaging systems, some or all of which may be configured to provide the person with one or more one electronic messaging accounts.

Also, some or all of these electronic messaging systems may be adapted to associate a set of one or more various recipient identifiers with an individual electronic messaging account.

Accordingly, when an electronic messaging system receives an electronic message addressed to a recipient identifier, the electronic messaging system may deliver the electronic message to the associated electronic messaging account.

In some instances, a "primary" recipient identifier is associated with an electronic messaging account. The "primary" recipient identifier may be used for storing and retrieving electronic messages for a particular system user and/or for granting access to the electronic messaging account. Often, one or more "secondary" recipient identifiers are considered aliases to the electronic messaging account and may be used for receiving electronic messages. However, a system need not make distinctions between primary and secondary recipient identifiers and may treat recipient identifiers the same, similarly, or in an entirely different manner, depending on the intended purpose of the electronic messaging system.

One embodiment can be illustrated using the example of a person who has an electronic messaging account hosted by a first electronic messaging system that is configured to retrieve electronic messages from one or more other "external" electronic messaging accounts, such as messaging accounts hosted by one or more other electronic messaging systems. Accordingly, the first electronic messaging system retrieves, stores, and displays electronic messages from a variety of other electronic messaging systems. For example, in one embodiment, an electronic messaging system may host an account configured to receive electronic messages addressed to one or more recipient identifiers, and the electronic messaging system may also be configured to retrieve messages received from an HTTP e-mail account, a POP3 e-mail account, an IMAP e-mail account, other electronic messaging systems, and the like.

In this embodiment, the person has a first electronic messaging account hosted by a first electronic messaging system and at least one "forwarding" electronic messaging account hosted by a second electronic messaging system. The second electronic messaging system may advantageously be configured to receive electronic messages addressed to recipient identifiers associated with the "forwarding" electronic messaging accounts, to optionally save a persistent copy of those received electronic messages, and to forward a copy of the those received electronic messages to at least one recipient identifier associated with the first electronic messaging system. Thus, recipient identifiers associated with the "forwarding" electronic messaging accounts may be used as aliases for sending electronic messages to the first electronic messaging account. Of course, recipient identifiers that are associated with a "forwarding" electronic messaging account may be used as aliases for sending electronic messages to a plurality of other electronic messaging accounts.

It will be appreciated that a person may have any number of a variety of other electronic messaging accounts that may have any suitable type of associated recipient identifiers and that may be hosted by any number of other suitable types of electronic messaging systems.

In certain embodiments, user identifier information is used in making decisions on how to process an incoming electronic message, which can help reduce some confusion and frustration associated with certain electronic messaging systems. For example, a system or method may access certain user identifier information to determine—based at least in part upon the content of the user identifier information—whether to deliver the electronic message to an intended recipient, how to deliver the electronic message to an intended recipient, whether to delay the delivery of the electronic message to the intended recipient, whether to delete the electronic message, whether to initiate a challenge-response process, or how to process the electronic message in any other suitable manner. Because accessing the user identifier information often can be performed without prompting the intended recipient and without prompting the sender of the electronic message, a system or method need not prompt (or otherwise burden) the sender or the intended recipient. Of course, in determining how to process an electronic message, a system and method may use user identifier information and/or any other suitable information. Further, a system or method may prompt the intended recipient, the sender of the electronic message, or both in determining how to process an electronic message—depending upon, for example, the intended purpose of the system or method.

As used in the context of this disclosure, the terms "electronic messaging" and "electronic messages" are broad terms, and are used in their ordinary meaning, and includes, but not limited to, e-mail; instant messaging; telephone; voicemail; facsimile; paging; mobile phone text messaging; forms of electronic communication that use a recipient identifier (e.g., recipient's address); forms of electronic communication that use a sender identifier (e.g., a sender's address); forms of electronic communication that use a sender identifier and a recipient identifier; any other form of sending a message electronically; or the like. For sake of simplicity, the following overview of electronic messaging is described in the context of e-mail sent over the Internet.

A brief review of an embodiment of an electronic mailing system over the Internet is provided as follows: Generally, a sender's computer sends an e-mail to a recipient's computer.

The e-mail is routed through one or more simple mail transfer protocol ("SMTP") servers before arriving at a server associated with the recipient's computer. The server associated with the recipient's computer may be a server residing on a local area network with the recipient's computer, a server that the recipient's computer accesses via a modem pool or with another Internet connection, a web server that provides web-based electronic messaging services to the recipient's computer, a server that operates with the recipient's computer in any other suitable network configuration, or any other suitable computing device.

To initiate transmission of the e-mail to the recipient, the sender addresses the e-mail using the recipient's e-mail address. Such recipients may be direct recipients (often designated in a "to:" field), indirect recipients (often designated in a "cc:" or carbon copy fields, or "bcc:" or blind carbon copy fields), or any other suitable type of recipient. Recipient's e-mail addresses may be obtained by the sender in any of a variety of manners. Senders of unwanted e-mail often obtain the recipient's e-mail address from bulk mailing lists. The recipient's computer may comprise any suitable hardware, software, or the like. In one embodiment, the recipient's computer includes a data storage device, a mail processor (such as an application that processes the e-mail), and one or more applications (such as a calendaring program, a contacts program, or the like). The data storage device may store data used by the mail processor, by the applications, or both. A software package may combine the mail processor with the applications to perform mail processing, other data management functions, or any other suitable function.

II. Exemplary Electronic Messaging Systems

Figure 1B:
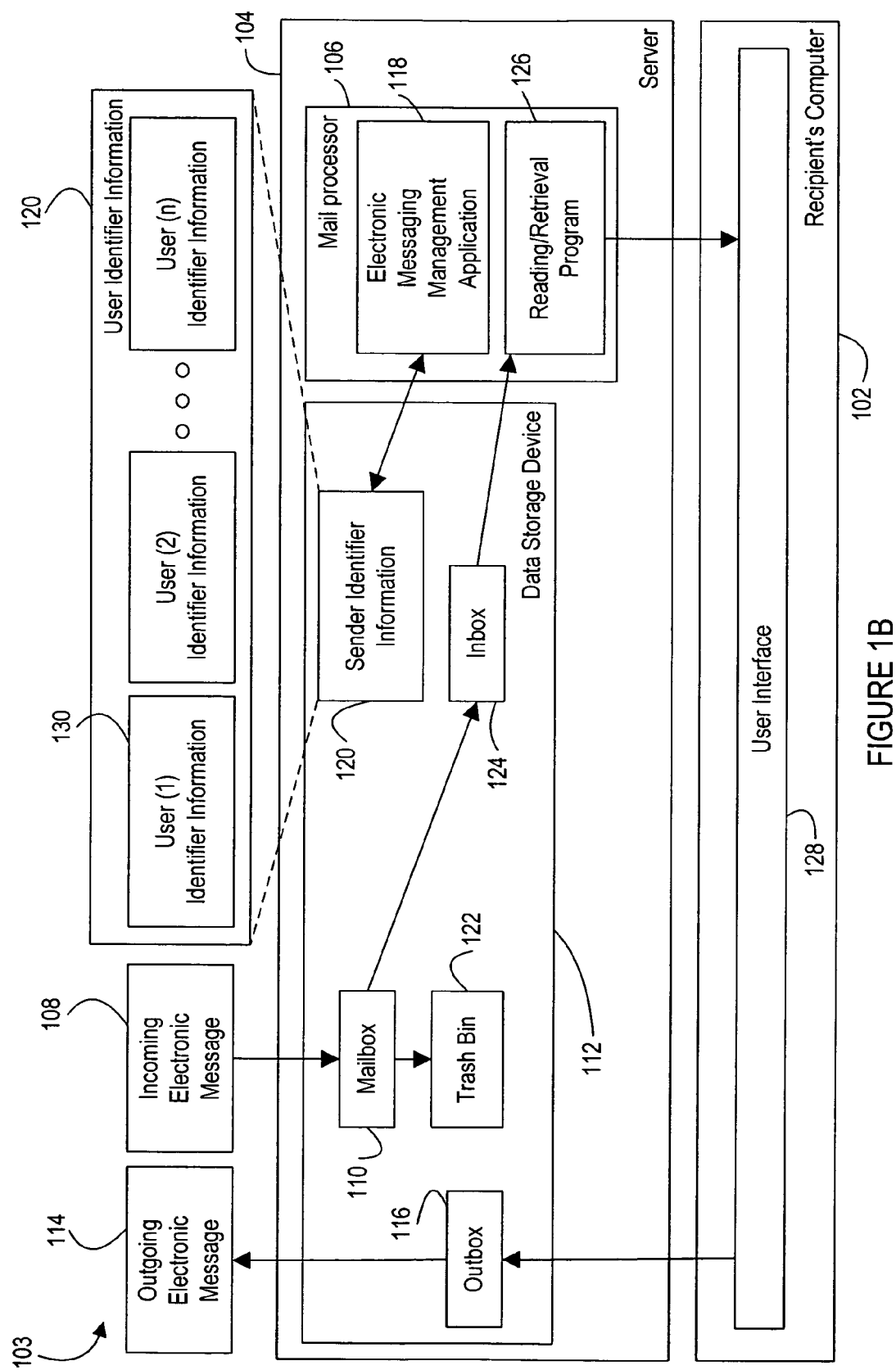
FIG. 1B is block diagram illustrating an exemplary embodiment of an electronic messaging system.

As described in further detail below, embodiments of the invention relate to methods use in challenge-response systems for substantially avoiding challenges sent in response to self-addressed electronic messages. These processes may take place among one or more suitable locations including, but not limited to, a recipient's computer, a server associated with a recipient's computer, one or more other computers, one or more other computing devices, or the like. FIGS. 1A and 1B and the following discussion present details of examples of suitable electronic messaging systems in which the methods of the invention can be performed.

FIG. 1A is block diagram illustrating an exemplary embodiment of an electronic messaging system 101 including a recipient's computer 102 that may process electronic messages. FIG. 1B is block diagram illustrating an exemplary embodiment of an electronic messaging system 103 including a server 104 that may process electronic messages.

In the embodiment illustrated in FIG. 1A, the recipient's computer 102 includes a mail processor 106. The mail processor 106 examines and processes one or more incoming electronic messages 108, which are be stored at a mailbox 110 of a data storage device 112.

An electronic message includes one or more associated identifiers. For example, the incoming electronic message 108 may include a recipient identifier (such as a recipient address, a recipient login name, a recipient chat name, a recipient e-mail address, a recipient telephone number, or the like) in the body, one or more headers, and/or in any other portion of the electronic message. The incoming electronic message 108 may include a sender identifier (such as a sender address, a sender login name, a sender chat name, a sender e-mail address, a sender telephone number, or the like) in the body, one or more headers, and/or in any other portion of the electronic message. These identifiers can be communicated, for example, as part of an "envelope" of an e-mail according to the Simple Mail Transfer Protocol ("SMTP") protocol.

As shown in FIG. 1A, the mailbox 110 holds an incoming electronic message 108 until the incoming electronic message 108 is processed or until any other suitable event or time. The mail processor 106 examines and processes one or more outgoing electronic messages 114, which may be transmitted from an outbox 116 of the data storage device 112.

III. User Identifier Information

In the embodiment of FIG. 1A, the recipient's computer 102 comprises an electronic messaging management application 118, which accesses the user identifier information 120 to make decisions regarding how to process electronic messages. These decisions can include whether to deliver the electronic message to an intended recipient, how to deliver the electronic message to an intended recipient, whether to delay the delivery of the electronic message to the intended recipient, whether to delete the electronic message, whether to initiate a challenge-response process, or the like. The electronic messaging management application 118 may provide these and/or any other suitable features, depending on the intended use of the electronic messaging management application 118.

As described in greater detail below, the user identifier information can be used to avoid sending challenge messages in response to self-addressed electronic messages. In addition, the user identifier information can be used to determine whether an electronic message has been generated and delivered locally without having been delivered over the Internet or has otherwise been sent by a trusted server. This information is useful because it can be used to avoid sending a challenge in cases in which the electronic message has been generated locally or otherwise originates from a trusted server.

In one embodiment, the electronic messaging management application 118 may access some or all of the user identifier information 120 to determine whether an electronic message should be delivered to a recipient and/or how an electronic message should be delivered to a recipient. If an electronic message should not be delivered, the electronic message may be sent to a trash bin 122, may be deleted, or may be processed in any other suitable fashion. If an electronic message should be delivered, the electronic message may be sent to a folder or directory (such as an inbox 124) or the like. In one exemplary embodiment, an electronic messaging account includes folders that are configured to contain electronic messages and that are used to organize various categories of electronic messages.

A reading/retrieval program 126 accesses electronic messages from the inbox 124 (or any other folder) to provide the electronic messages to a user interface 128. The user interface 128 allows a recipient system user to interact with the mail processor 106, the electronic messaging management application 118, the user identifier information 120, or any other suitable components. For example, in one embodiment, through user interface 128, the recipient accesses and/or manipulates one or more electronic messages, some or all of the user identifier information 120, or any other suitable data structure or data.

In the embodiment of FIG. 1B, the electronic messaging management application 118 is integrated into a mail processor 106 on the server 104. Alternately, the electronic messaging management application 118 is separate from (and interact with) the mail processor 106 on the server 104. As illustrated, a recipient's computer 102 includes a user interface 128 as an interface between the recipient and the server 104. The methods performed by server 104 may be operated according to an application service provider (ASP) model hosted by the server 104. The recipient computer 102 accesses one or more methods performed by server 104 over the Internet via an application service provider (ASP) model hosted by an Internet server. Of course, functionality may be accessed in any other suitable fashion. Moreover, the electronic messaging management application 118 may be embodied in any suitable form.

As shown in FIGS. 1A and 1B, the electronic messaging management application 118 accesses the user identifier information 120. In some embodiments, the electronic messaging management application 118 determines, based at least in part upon the content of the user identifier information 120 that is associated with a system user of an electronic messaging system, how an incoming electronic message should be processed. "User identifier information" is a broad term, and is used in its ordinary meaning, and includes, but is not limited to, one or more identifiers (such as an address, a login name, a chat name, an e-mail address, a telephone number, and the like), one or more server identifiers (such as an IP address, an identifier associated with a server, an identifier associated with a plurality of servers such as a server farm, or the like), one or more authentication tokens (such as an electronic message header, a hash key, a digital signature, or the like), any other information suitable for identifying a recipient of an electronic message, any other information suitable for identifying a computing system associated with a recipient of an electronic message, and the like. The user information can be changed by the system user, automatically, in any other suitable way.

In one embodiment, the user identifier information 120 includes user identifier information associated with system users of an electronic messaging system. For example, as shown in FIGS. 1A and 1B, the user identifier information 120 can include user identifier information (such as user identifier information 130) of some or all of a set of system users. The user identifier information may include user identifier information that a particular system user maintains and that, for example, describes electronic messaging accounts the system user uses to send and/or receive electronic messages; electronic messaging systems that the system user uses to send and/or receive electronic messages; electronic messaging identifiers (such as sender identifier, a recipient identifier, or the like) that the system user uses to send and/or receive electronic messages; and any combination thereof.

Figure 2:
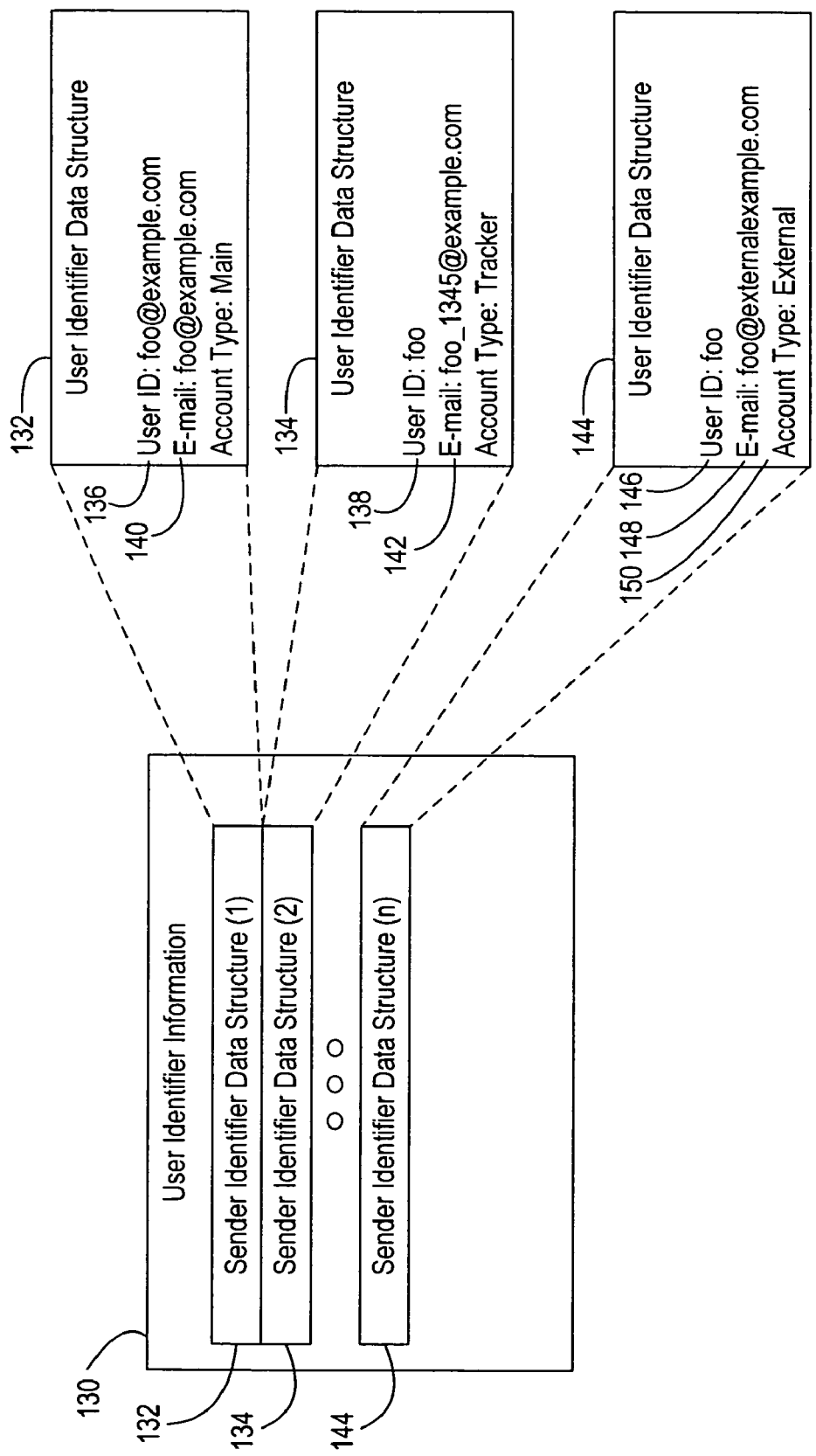
FIG. 2 is block diagram of a exemplary set of user identifier information according to an embodiment of the invention.

FIG. 2 is block diagram of an exemplary set of user identifier information according to an embodiment of the invention. As shown in FIG. 2, the user identifier information 130 includes a set of data structures containing user identifier information. In this embodiment, the user identifier information 130 includes a set of one or more user identifier data structures, such as user identifier data structures 132 and 134.

A user identifier data structure includes a series of fields that may have associated information. For example, as shown in FIG. 2, a user identifier data structure may include a user identifier (such as user identifiers 136 and 138) adapted to identify a particular system user. The user identifier may comprise any suitable value, certificate, key, code, text, or the like that may be used to identify a system user, such as an address, a login name, a chat name, an e-mail address, a telephone number, a telephone identifier, an arbitrarily generated key, or the like.

The user identifier data structure may include one or more electronic messaging identifiers, such as sender identifier, a recipient identifier, or the like. Examples of electronic messaging identifiers may include, but are not limited to, an e-mail address 140, an e-mail with a tracker 142, and the like. An e-mail address typically comprises a string, including a username followed by the "@" symbol, and followed by a host name and domain name of a mail server. For example, in the e-mail address "john@example.com," "john" is the username.

In one embodiment, a first username—and one or more usernames at least partially derived from the first username—may be used to send e-mail to an individual account. For example, a first user name may comprise a first string, and a second user name may comprise a second string (such as a "tracker") that is concatenated, inserted, appended, parsed into, added to, or otherwise combined with some or all of the first string. This technique uses the tracker portion of the e-mail address to accept e-mail from only senders that are associated with the tracker. More details of the use of such trackers are described in U.S. patent application Ser. No. 10/361,241, entitled FILTERING ELECTRONIC MESSAGES WHILE PERMITTING DELIVERY OF SOLICITED ELECTRONIC MESSAGES and filed Feb.10, 2003, which is hereby incorporated herein by reference herein.

In the embodiment of FIG. 2, a user identifier data structure (such as a user identifier data structure 144) includes a user identifier (such as a user identifier 146), an electronic messaging identifier (such as an e-mail address 148), and an electronic messaging account type (such as an electronic messaging account type 150). The electronic messaging account type indicates whether the associated e-mail address (such as the e-mail address 148) is associated with an external account from which the electronic messaging system can retrieve electronic messages, whether the associated e-mail address is associated with a forwarding account from which electronic messages are automatically forwarded to the electronic messaging system, whether the associated e-mail address is hosted by the electronic messaging system, whether the associated e-mail address is a main or primary e-mail address hosted by the electronic messaging system, whether the associated e-mail address is a secondary address hosted by the electronic messaging system, whether the associated e-mail address is a derived address hosted by the electronic messaging system, whether the associated e-mail address is an alias hosted by the electronic messaging system, and the like.

As mentioned above, a person may have one or more electronic messaging accounts (which may be hosted by one, two, or more electronic message systems) and each electronic message account may have one or more associated recipient identifiers. Thus, user identifier data structures can be used by an electronic messaging system to associate a particular user of the electronic messaging system with at least one recipient identifier configured to send an electronic message to an electronic messaging account hosted by the electronic messaging system and/or with at least one recipient identifier configured to send an electronic message to an electronic messaging account hosted by another electronic messaging system.

For example, using one or more user identifier data structures, an e-mail system can associate a particular user of the e-mail system with at least one e-mail address or alias configured to send e-mail to at least one e-mail account hosted by the e-mail system; with a plurality of e-mail addresses or aliases configured to send e-mail to at least one e-mail account hosted by the e-mail system; with at least one e-mail address or alias configured to send e-mail to at least one e-mail account hosted by another e-mail system; with a plurality of e-mail addresses or aliases configured to send e-mail to at least one e-mail account hosted by another e-mail system; or any suitable combination thereof. Further, using one or more user identifier data structures, the e-mail system can determine whether a sender identifier associated with an electronic message, a recipient identifier associated with an electronic message or both are a main or primary e-mail address hosted by the electronic messaging system, are associated with a forwarding account, are associated with an external account, are derived addresses hosted by the electronic messaging system, and the like.

Although the foregoing embodiments have been described in the context of user identifier data structures, the user identifier information 130 may be stored using any other suitable data structure or system and may be organized in any other suitable manner.

IV. Exemplary Methods and Flow Diagrams

Figure 3:
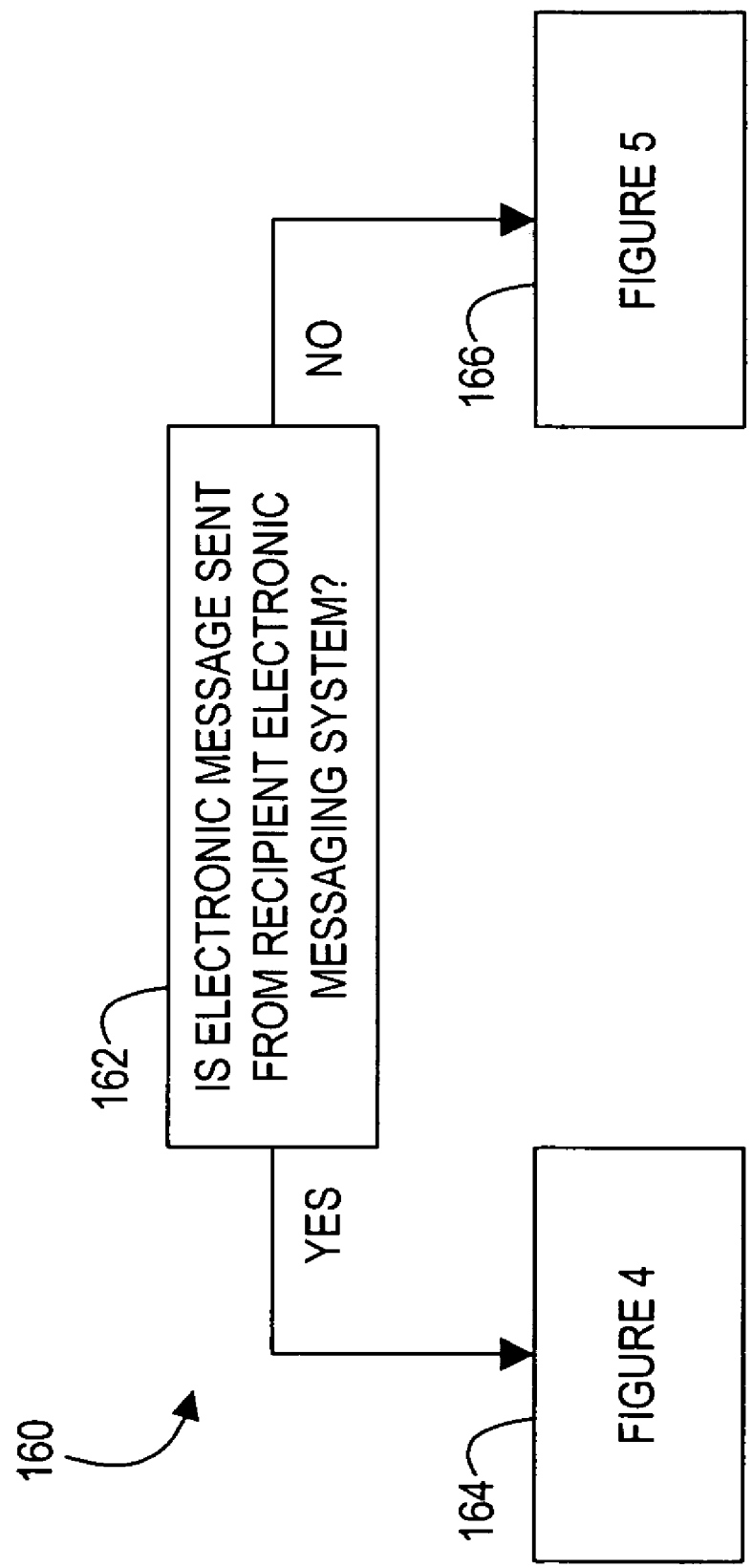
FIG. 3 is a flowchart illustrating an exemplary embodiment of a method for managing the delivery of an electronic message.

FIG. 3 is a flowchart illustrating an exemplary embodiment of a method 160 for managing the delivery of an electronic message. As shown in FIG. 3, at block 162, an electronic messaging system determines whether an incoming electronic message has been sent internally, that is, the electronic message was sent using the recipient's electronic messaging system. For example, in some instances, an electronic messaging system hosts a plurality of accounts that are used to send electronic messages among some or all of those hosted accounts. A common example of an internally sent electronic message is one that has been generated and sent internally in a local area network of an enterprise as opposed to being transmitted between local area networks over the Internet. The electronic messaging system determines whether an incoming electronic message has been sent internally by receiving a system identifier via SMTP or another suitable protocol; by examining portions of the electronic message (such as the body, the header, or the like); by authenticating a key, code, certificate, or the like; or by any other suitable method. The information identifying the server that has sent the electronic message is typically in the form of an Internet Protocol (IP) address of the server, and is a portion of an electronic message that generally cannot be spoofed by a spammer.

Figure 4:
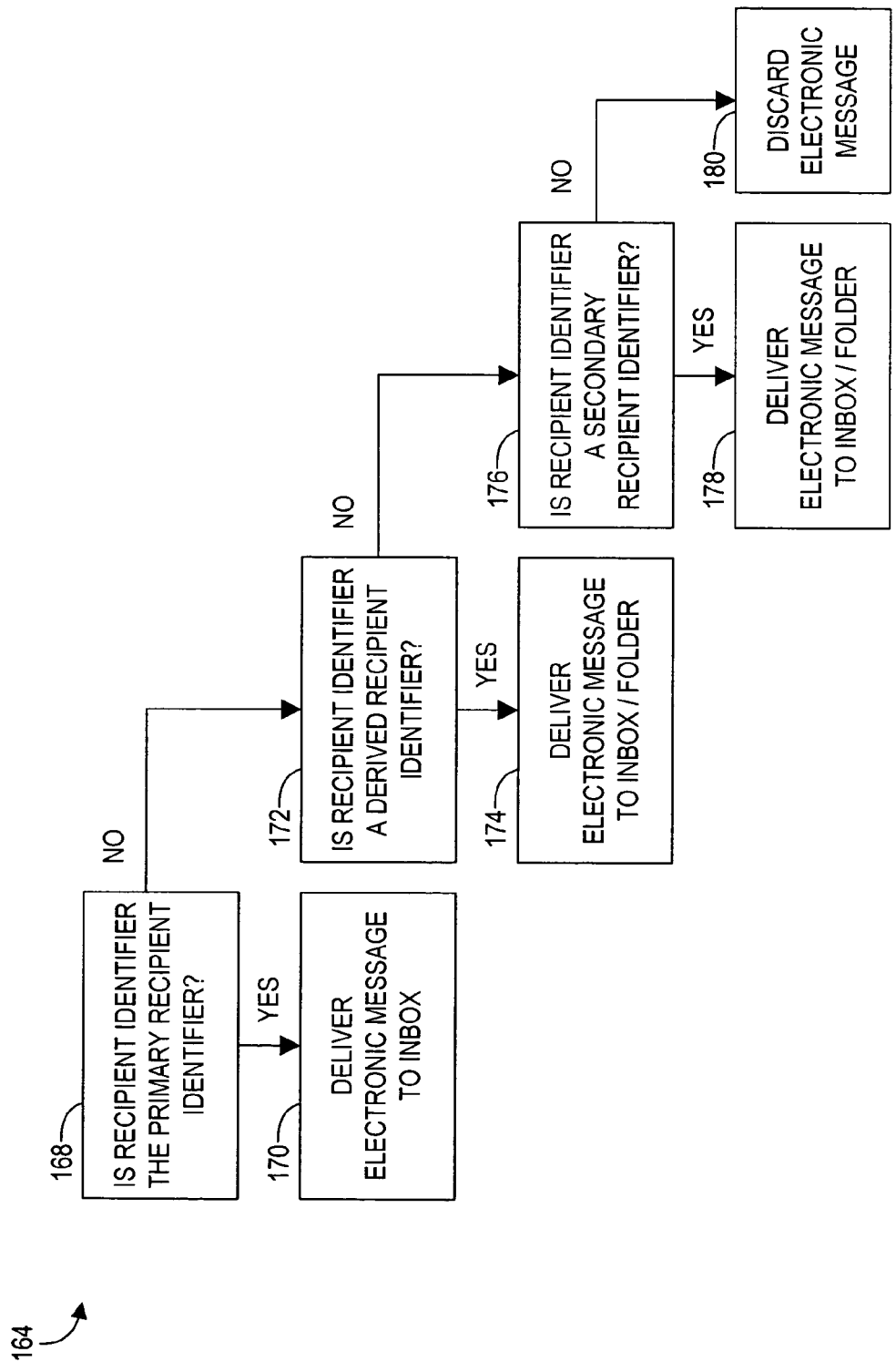
FIG. 4 is a flowchart illustrating an exemplary embodiment of a method for managing the delivery of an internally sent electronic message.

If, at block 162, the incoming electronic message has been sent internally, the electronic messaging system performs a method 164 illustrated in FIG. 4. If, at block 162, the incoming electronic message has not been sent internally, the electronic messaging system performs a method 166 illustrated in FIG. 5.

FIG. 4 is a flowchart illustrating an exemplary embodiment of a method 164 that may be used for managing delivery of an internally sent electronic message. In general, internally sent electronic messages are less likely to be unwanted and can often be designated as being approved for delivery without initiating a challenge. As shown in FIG. 4, at block 168, an electronic messaging system determines whether a recipient identifier associated with an electronic message is a primary recipient identifier. For example, the electronic messaging system accesses user identifier data structures to determine if the recipient identifier has an associated account type that indicates the recipient identifier is a primary recipient identifier hosted by the electronic messaging system. If, at block 168, the recipient identifier is a primary recipient identifier, the electronic messaging system, at block 170, delivers the electronic message to a particular folder (such as an inbox) that can be accessed using an electronic messaging account associated with the recipient identifier. If, at block 168, the recipient identifier is not a primary recipient identifier, the electronic messaging system proceeds to block 172.

At block 172, the electronic messaging system determines whether the recipient identifier associated with an electronic message is at least partially derived from another recipient identifier (such as a primary recipient identifier), such that both recipient identifiers may be used to send an electronic message to an electronic messaging account. For example, the electronic messaging system accesses user identifier data structures to determine if the recipient identifier has an associated account type that indicates the recipient identifier includes a tracker or indicates that the recipient identifier is another type of derived recipient identifier. If, at block 172, the recipient identifier is a derived recipient identifier, the electronic messaging system, at block 174, delivers the electronic message to a particular folder (such as an inbox or a folder associated with the derived recipient identifier). If, at block 172, the recipient identifier is not is at least partially derived from another recipient identifier, the electronic messaging system proceeds to block 176.

At block 176, the electronic messaging system determines whether the recipient identifier associated with an electronic message is a secondary recipient identifier. For example, the electronic messaging system accesses user identifier data structures to determine if the recipient identifier has an associated account type that indicates the recipient identifier is a secondary recipient identifier hosted by the electronic messaging system. If, at block 176, the recipient identifier is a secondary recipient identifier, the electronic messaging system, at block 178, delivers the electronic message to a particular folder (such as an inbox or a folder associated with the secondary recipient identifier). If, at block 176, the recipient identifier is not is at least partially derived from another recipient identifier, the electronic messaging system proceeds to block 180, at which the electronic message is optionally discarded or processed in any other suitable fashion.

Figure 5:
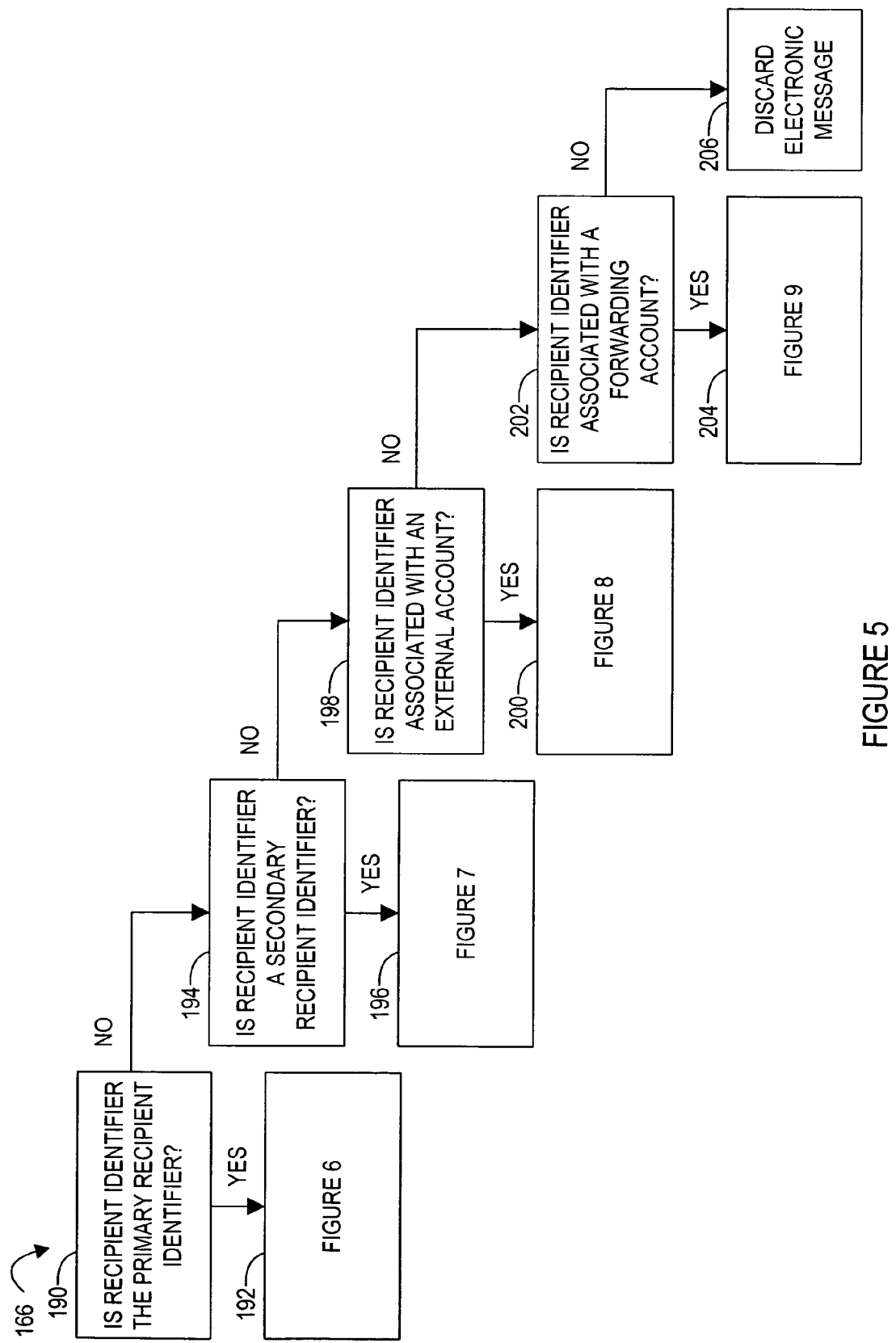
FIG. 5 is a flowchart illustrating an exemplary embodiment of a method for managing the delivery of an externally sent electronic message.

FIG. 5 is a flowchart illustrating an exemplary embodiment of a method 166 for managing the delivery of an externally sent electronic message. The method of FIG. 5 can be used to determine whether an externally sent electronic message is self-addressed, in which case, the self-addressed electronic message can be delivered without issuing a challenge. It is noted that FIGS. 6-9 represent portions of the overall method illustrated in FIG. 5. As shown in FIG. 5, at block 190, an electronic messaging system determines whether a recipient identifier associated with an electronic message is a primary recipient identifier. If, at block 190, the recipient identifier is a primary recipient identifier, the electronic messaging system performs a method 192 shown in FIG. 6. If, at block 190, the recipient identifier is not a primary recipient identifier, the electronic messaging system proceeds to block 194.

At block 194, the electronic messaging system determines whether the recipient identifier associated with the electronic message is a secondary recipient identifier. For example, the electronic messaging system accesses user identifier data structures to determine if the recipient identifier has an associated account type that indicates the recipient identifier is a secondary recipient identifier (and/or a derived recipient identifier) hosted by the electronic messaging system. If, at block 194, the recipient identifier is a secondary recipient identifier, the electronic messaging system performs a method 196 shown in FIG. 7. If, at block 194, the recipient identifier is not a secondary recipient identifier, the electronic messaging system proceeds to block 198.

At block 198, the electronic messaging system determines whether the recipient identifier associated with the electronic message is associated with an external account from which the electronic messaging system is configured to retrieve one or more electronic messages. For example, the electronic messaging system accesses user identifier data structures to determine if the recipient identifier is associated with an external account from which the electronic messaging system may retrieve electronic messages. If, at block 198, the recipient identifier is associated with an external account from which the electronic messaging system is configured to retrieve electronic messages, the electronic messaging system performs a method 200 shown in FIG. 8. If, at block 198, the recipient identifier is not associated with an external account from which the electronic messaging system is configured to retrieve electronic messages, the electronic messaging system proceeds to block 202.

At block 202, the electronic messaging system determines whether the recipient identifier associated with the electronic message is associated with a forwarding account. For example, the electronic messaging system accesses user identifier data structures to determine if the recipient identifier is associated with a forwarding account from which electronic messages are automatically forwarded to the electronic messaging system. If, at block 202, the recipient identifier is associated with a forwarding account, the electronic messaging system performs a method 204 shown in FIG. 9. If, at block 202, the recipient identifier is not associated with a forwarding account, the electronic messaging system, at block 206, discards the electronic message or processes the electronic message in any other suitable fashion.

Figure 6:
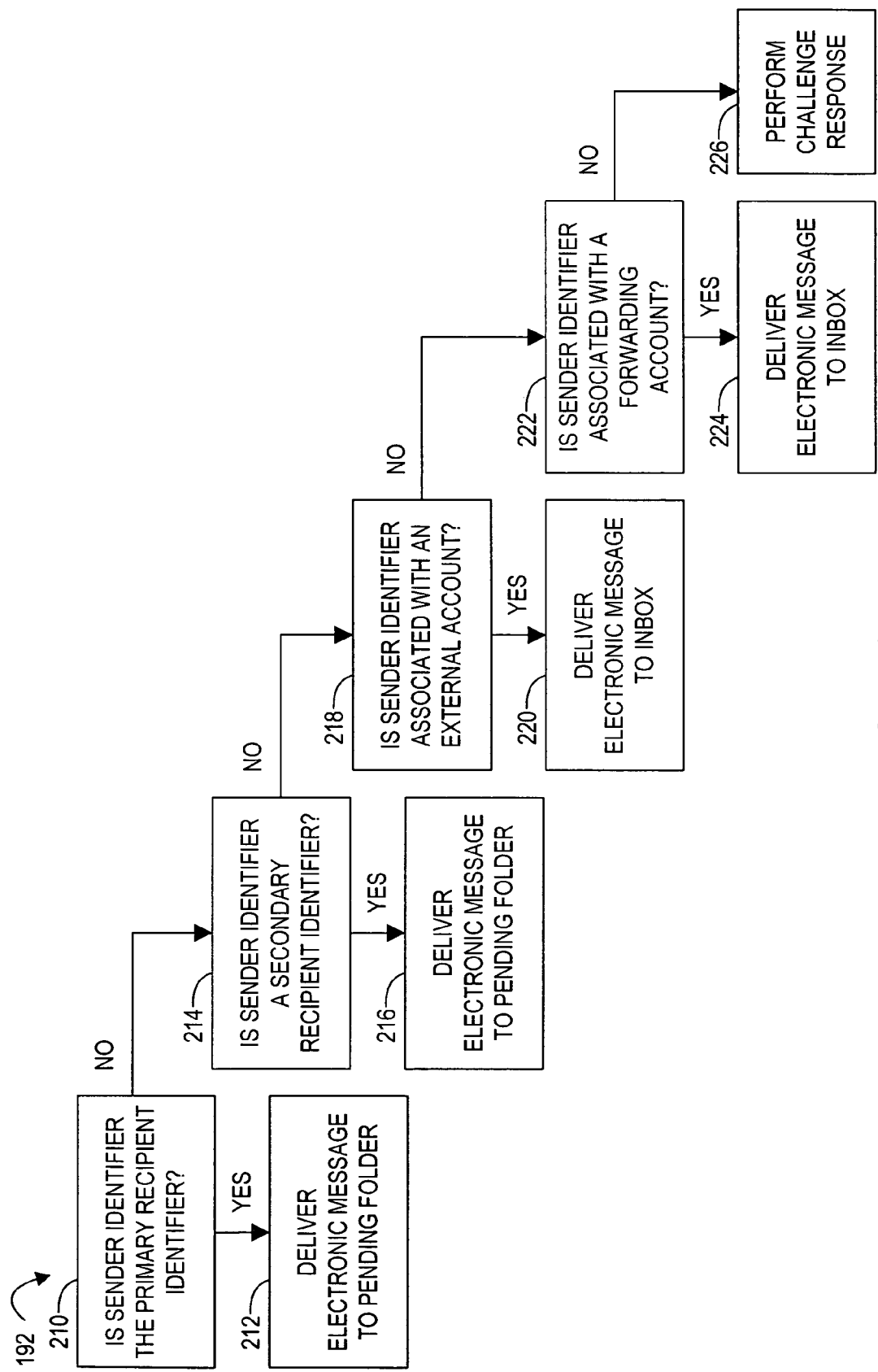
FIG. 6 is a flowchart illustrating an exemplary embodiment of a method for managing the delivery of an electronic message sent to a primary recipient identifier.

FIG. 6 is a flowchart illustrating an exemplary embodiment of a method 192 for managing the delivery of an electronic message sent to a primary recipient. As shown in FIG. 6, at block 210, an electronic messaging system determines whether a sender identifier associated with an electronic message is a primary recipient identifier, and represents a portion of the overall method of FIG. 5 that is performed in response to an externally sent electronic message. For example, the electronic messaging system accesses user identifier data structures to determine if the sender identifier has an associated account type that indicates the sender identifier is a primary recipient identifier hosted by the electronic messaging system. If, at block 210, the sender identifier is a primary recipient identifier, the electronic messaging system proceeds to block 212, where the electronic messaging system optionally delivers the electronic message to a "pending" folder where the electronic messaging system performs anti-spam filtering processes. If, at block 210, the sender identifier is not a primary recipient identifier, the electronic messaging system proceeds to block 214.

At block 214, the electronic messaging system determines whether the sender identifier associated with the electronic message is a secondary recipient identifier. For example, the electronic messaging system accesses user identifier data structures to determine if the sender identifier has an associated account type that indicates the sender identifier is a secondary recipient identifier (and/or a derived recipient identifier) hosted by the electronic messaging system. If, at block 214, the sender identifier is a secondary recipient identifier, the electronic messaging system proceeds to block 216, where the electronic messaging system optionally delivers the electronic message to a "pending" folder where the electronic messaging system performs anti-spam filtering processes. If, at block 214, the sender identifier is not a secondary recipient identifier, the electronic messaging system proceeds to block 218.

At block 218, the electronic messaging system determines whether the sender identifier associated with the electronic message is associated with an external account from which the electronic messaging system is configured to retrieve one or more electronic messages. For example, the electronic messaging system accesses user identifier data structures to determine if the sender identifier has an associated account type that the sender identifier is associated with an external account from which the electronic messaging system may retrieve electronic messages. If, at block 218, the sender identifier is associated with an external account from which the electronic messaging system is configured to retrieve electronic messages, the electronic messaging system, at block 220, delivers the electronic message to a folder (such as an inbox). If, at block 218, the recipient identifier is not associated with an external account from which the electronic messaging system is configured to retrieve electronic messages, the electronic messaging system proceeds to block 222.

At block 222, the electronic messaging system determines whether the sender identifier associated with the electronic message is associated with a forwarding account. For example, the electronic messaging system accesses user identifier data structures to determine if the sender identifier has an associated account type that indicates that the sender identifier is associated with a forwarding account from which electronic messages are automatically forwarded to the electronic messaging system. If, at block 222, the sender identifier is associated with a forwarding account, the electronic messaging system, at block 224, delivers the electronic message to a folder (such as an inbox). If, at block 222, the sender identifier is not associated with a forwarding account, the electronic messaging system, at block 226, performs one or more challenge-response processes or may process the electronic message in any other suitable fashion.

Figure 7:
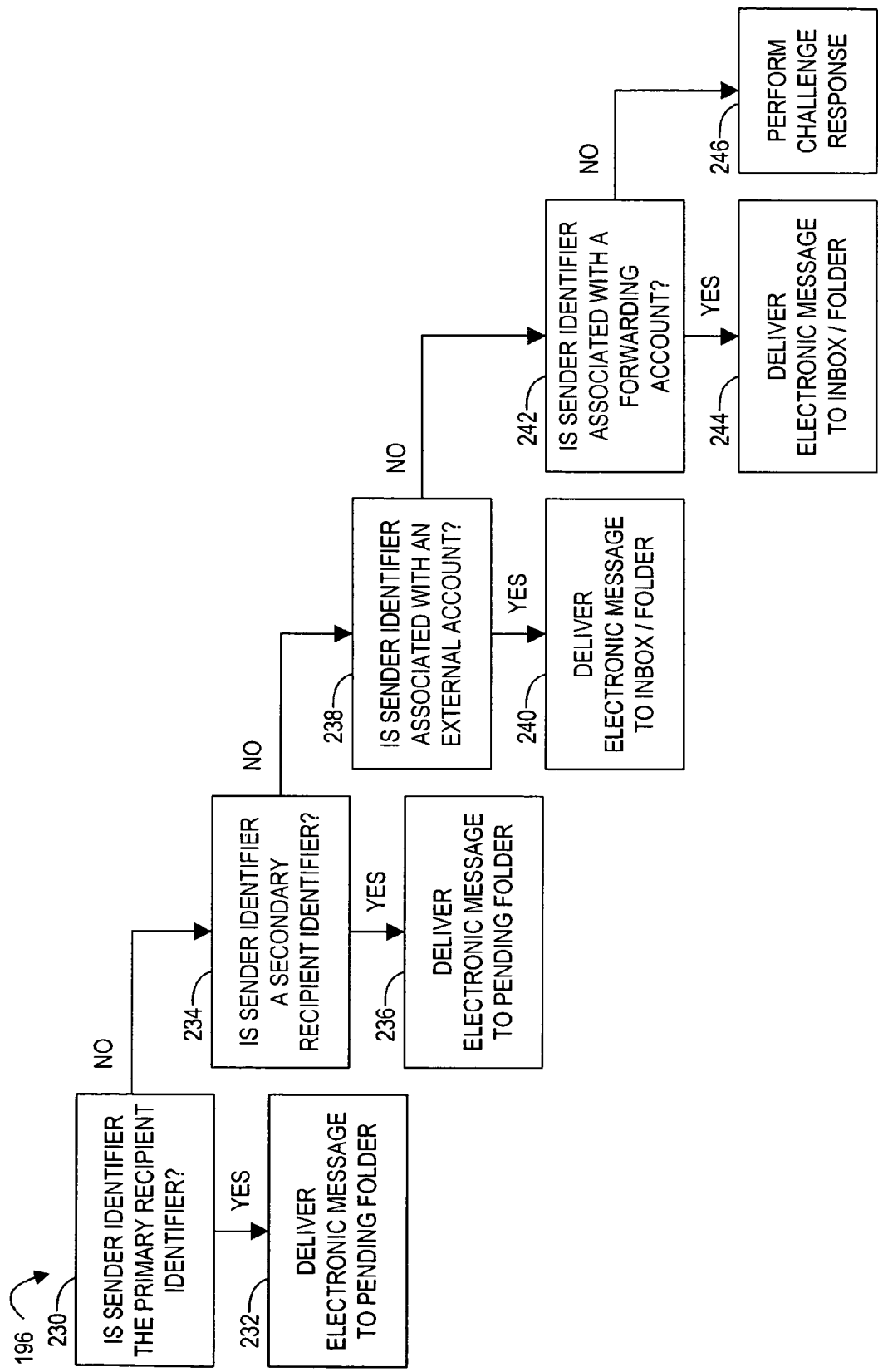
FIG. 7 is a flowchart illustrating an exemplary embodiment of a method for managing the delivery of an electronic message sent to a secondary identifier.

FIG. 7 is a flowchart illustrating an exemplary embodiment of a method 196 for managing the delivery of an electronic message sent to a secondary identifier. As shown in FIG. 7, an electronic messaging system, at block 230, determines whether a sender identifier associated with an electronic message is a primary recipient identifier, and represents a portion of the overall method of FIG. 5 that is performed in response to an externally sent electronic message. If, at block 230, the sender identifier is a primary recipient identifier, the electronic messaging system, at block 232, optionally delivers the electronic message to a "pending" folder where the electronic messaging system performs anti-spam filtering processes), or, in another embodiment, the electronic messaging system, at the block 232, delivers the electronic message to a particular folder (such as an inbox or a folder associated with the recipient identifier). If, at block 230, the sender identifier is not a primary recipient identifier, the electronic messaging system proceeds to block 234.

At block 234, the electronic messaging system determines whether the sender identifier associated with the electronic message is a secondary recipient identifier. If, at block 234, the sender identifier is a secondary recipient identifier, the electronic messaging system, at block 236, optionally delivers the electronic message to a "pending" folder where the electronic messaging system performs anti-spam filtering processes), or, in another embodiment, the electronic messaging system, at the block 236, delivers the electronic message to a particular folder (such as an inbox or a folder associated with the recipient identifier). If, at block 234, the sender identifier is not a secondary recipient identifier, the electronic messaging system proceeds to block 238.

At block 238, the electronic messaging system determines whether the sender identifier associated with the electronic message is associated with an external account from which the electronic messaging system is configured to retrieve one or more electronic messages. If, at block 238, the sender identifier is associated with an external account from which the electronic messaging system is configured to retrieve electronic messages, the electronic messaging system, at block 240, delivers the electronic message to a particular folder (such as an inbox or a folder associated with the recipient identifier). If, at block 238, the recipient identifier is not associated with an external account from which the electronic messaging system is configured to retrieve electronic messages, the electronic messaging system proceeds to block 242.

At block 242, the electronic messaging system determines whether the sender identifier associated with the electronic message is associated with a forwarding account. If, at block 242, the sender identifier is associated with a forwarding account, the electronic messaging system, at block 244, delivers the electronic message to a particular folder (such as an inbox or a folder associated with the recipient identifier). If, at block 242, the sender identifier is not associated with a forwarding account, the electronic messaging system, at block 246, performs one or more challenge-response processes or may process the electronic message in any other suitable fashion.

Figure 8:
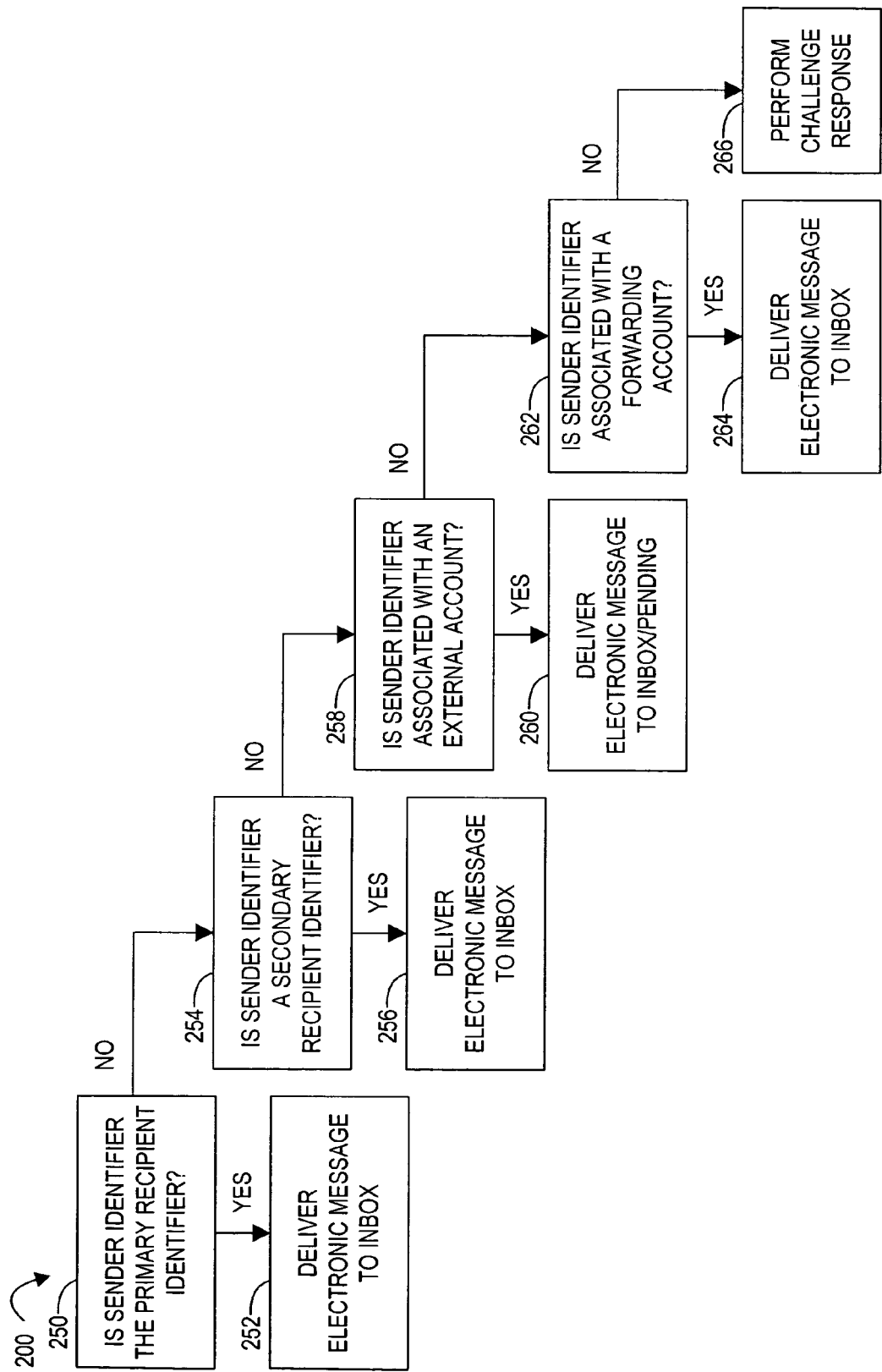
FIG. 8 is a flowchart illustrating an exemplary embodiment of a method for managing the delivery of an electronic message retrieved from an external electronic messaging account.

FIG. 8 is a flowchart illustrating an exemplary embodiment of a method 200 for managing the delivery of an electronic message retrieved from an external electronic messaging account, and represents a portion of the overall method of FIG. 5 that is performed in response to an externally sent electronic message. As shown in FIG. 8, after retrieving an electronic message from an external account, an electronic messaging system, at block 250, determines whether a sender identifier associated with an electronic message is a primary recipient identifier. If, at block 250, the sender identifier is a primary recipient identifier, the electronic messaging system, at block 252, delivers the electronic message to a particular folder (such as an inbox). If, at block 250, the sender identifier is not a primary recipient identifier, the electronic messaging system proceeds to block 254.

At block 254, the electronic messaging system determines whether the sender identifier associated with the electronic message is a secondary recipient identifier. If, at block 254, the sender identifier is a secondary recipient identifier, the electronic messaging system, at block 256, delivers the electronic message to a particular folder (such as an inbox). If, at block 254, the sender identifier is not a secondary recipient identifier, the electronic messaging system proceeds to block 258.

At block 258, the electronic messaging system determines whether the sender identifier associated with the electronic message is associated with an external account from which the electronic messaging system is configured to retrieve one or more electronic messages. If, at block 258, the sender identifier is associated with an external account from which the electronic messaging system is configured to retrieve electronic messages, the electronic messaging system proceeds to block 260. At block 260, if the sender identifier is not the same as the recipient identifier, the electronic messaging system may deliver the electronic message to a particular folder (such as an inbox). At block 260, if the sender identifier is the same as the recipient identifier, the electronic messaging system optionally delivers the electronic message to a "pending" folder where the electronic messaging system performs anti-spam filtering processes. If, at block 258, the recipient identifier is not associated with an external account from which the electronic messaging system is configured to retrieve electronic messages, the electronic messaging system proceeds to block 262.

At block 262, the electronic messaging system determines whether the sender identifier associated with the electronic message is associated with a forwarding account. If, at block 262, the sender identifier is associated with a forwarding account, the electronic messaging system, at block 264, delivers the electronic message to a particular folder (such as an inbox). If, at block 262, the sender identifier is not associated with a forwarding account, the electronic messaging system, at block 266, performs one or more challenge-response processes or may process the electronic message in any other suitable fashion.

Figure 9:
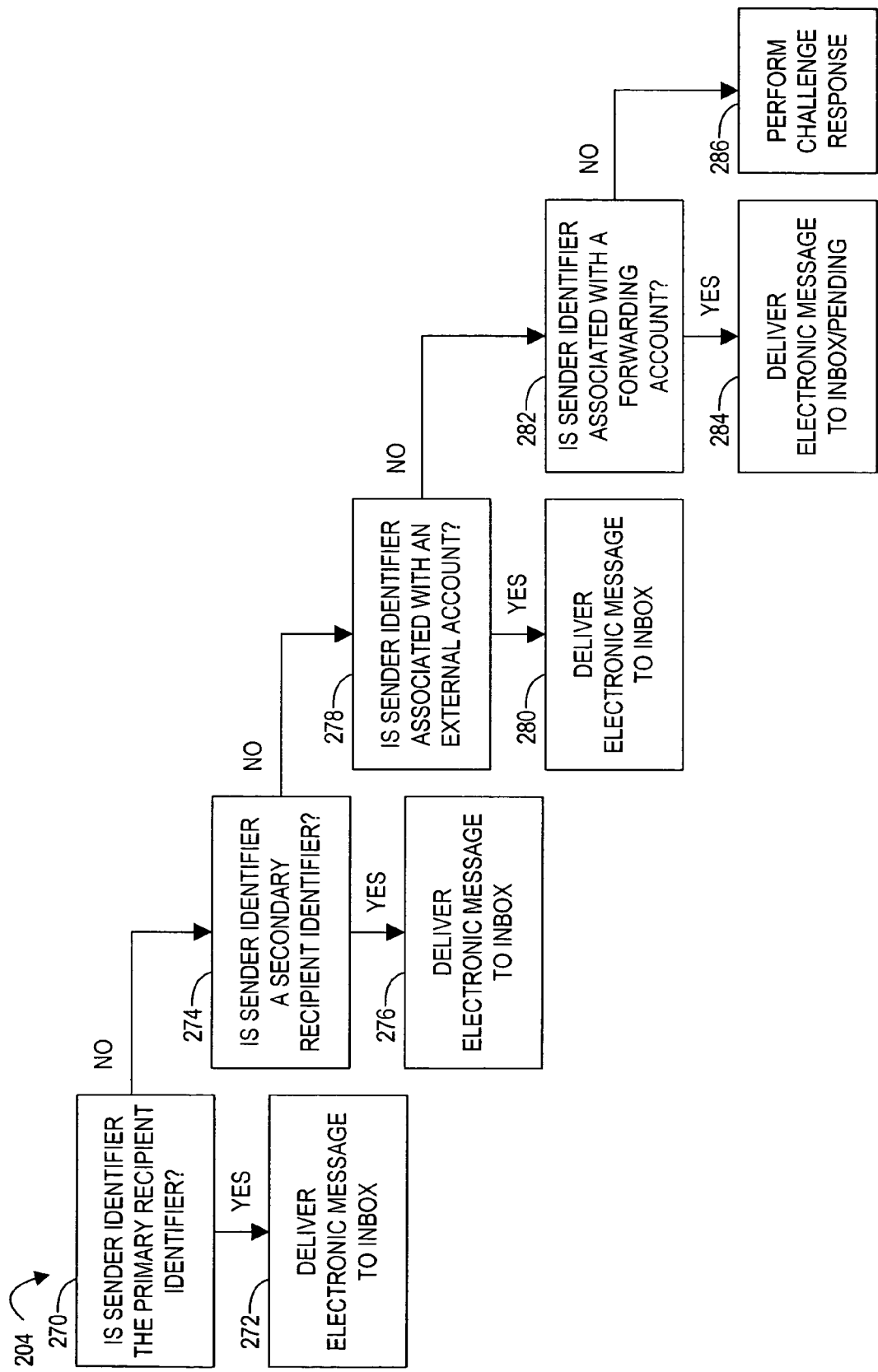
FIG. 9 is a flowchart illustrating an exemplary embodiment of a method for managing the delivery of an electronic message sent from a forwarding account.

FIG. 9 is a flowchart illustrating an exemplary embodiment of a method 204 for managing the delivery of an electronic message sent from a forwarding account, and represents a portion of the overall method of FIG. 5 that is performed in response to an externally sent electronic message. As shown in FIG. 9, at block 270, an electronic messaging system determines whether a sender identifier associated with an electronic message is a primary recipient identifier. If, at block 270, the sender identifier is a primary recipient identifier, the electronic messaging system, at block 272, delivers the electronic message to a particular folder (such as an inbox). If, at block 270, the sender identifier is not a primary recipient identifier, the electronic messaging system proceeds to block 274.

At block 274, the electronic messaging system determines whether the sender identifier associated with the electronic message is a secondary recipient identifier. If, at block 274, the sender identifier is a secondary recipient identifier, the electronic messaging system, at block 276, delivers the electronic message to a particular folder (such as an inbox). If, at block 274, the sender identifier is not a secondary recipient identifier, the electronic messaging system proceeds to block 278.

At block 278, the electronic messaging system determines whether the sender identifier associated with the electronic message is associated with an external account from which the electronic messaging system is configured to retrieve one or more electronic messages. If, at block 278, the sender identifier is associated with an external account from which the electronic messaging system is configured to retrieve electronic messages, may, at block 280, delivers the electronic message to a particular folder (such as an inbox). If, at block 278, the recipient identifier is not associated with an external account from which the electronic messaging system is configured to retrieve electronic messages, the electronic messaging system proceeds to block 282.

At block 282, the electronic messaging system determines whether the sender identifier associated with the electronic message is associated with a forwarding account. If, at block 282, the sender identifier associated with the electronic message is associated with a forwarding account, the electronic messaging system proceeds to block 284. At block 284, if the sender identifier is not the same as the recipient identifier, the electronic messaging system may deliver the electronic message to a particular folder (such as an inbox). At block 284, if the sender identifier is the same as the recipient identifier, the electronic messaging system optionally delivers the electronic message to a "pending" folder where the electronic messaging system performs anti-spam filtering processes. If, at block 282, the sender identifier associated with the electronic message is not associated with a forwarding account, the electronic messaging system, at block 286, performs one or more challenge-response processes or may process the electronic message in any other suitable fashion.

As shown in FIGS. 3-9, an incoming message may be processed in a variety of fashions using a recipient identifier. It will be appreciated that an incoming electronic message may have a plurality of recipient identifiers, which may be associated with a plurality of electronic messaging accounts. Accordingly, the incoming electronic message may be processed in the same, similar, or entirely different manners with respect to the various recipient identifiers and any associated electronic messaging accounts.

Further, FIGS. 3-9 illustrate merely optional embodiments of how electronic messages could be processed using a recipient identifier, a sender identifier, or both. Accordingly, it will be appreciated that electronic messages may be delivered to a variety of other folders (and the like) and that electronic messages may be processed in any other suitable fashion.

In one embodiment, an electronic messaging system optionally determines not to initiate a challenge-response process in response to receiving a self-addressed electronic message in which two or more recipient identifiers and/or sender identifiers associated with the electronic message are associated with the same recipient or the same system user. For example, a recipient identifier or a sender identifier may include those provided in an envelope of an electronic message, those within a portion of the electronic message, or both. In some instances, recipient identifiers are provided within a portion of the electronic message. Accordingly, the electronic messaging system can determine not to initiate a challenge-response process in response to receiving a self-addressed electronic message in which a predetermined number of identifiers associated with the electronic message are associated with the same system user or the same electronic messaging account. The predetermined number of recipient identifiers may be 2, 3, or more—depending upon the intended purpose.

V. Exemplary Operating and Computing Environments

The methods and systems described above can be implemented using software, hardware, or both hardware and software. For example, the software may advantageously be configured to reside on an addressable storage medium and be configured to execute on one or more processors. Thus, software, hardware, or both may include, by way of example, any suitable module, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays ("FPGA"), a field programmable logic arrays ("FPLAs"), a programmable logic array ("PLAs"), any programmable logic device, application-specific integrated circuits ("ASICs"), controllers, computers, and firmware to implement those methods and systems described above. The functionality provided for in the software, hardware, or both may be combined into fewer components or further separated into additional components. Additionally, the components may advantageously be implemented to execute on one or more computing devices. As used herein, "computing device" is a broad term and is used in its ordinary meaning and includes, but is not limited to, devices such as personal computers, desktop computers, laptop computers, palmtop computers, a general purpose computer, a special purpose computer, mobile telephones, personal digital assistants ("PDAs"), Internet terminals, multi-processor systems, hand-held computing devices, portable computing devices, microprocessor-based consumer electronics, programmable consumer electronics, network PCs, minicomputers, mainframe computers, computing devices that may generate data, computing devices that may have the need for storing data, and the like.

Also, one or more software modules, one or more hardware modules, or both may comprise a means for performing some or all of any of the methods described herein. Further, one or more software modules, one or more hardware modules, or both may comprise a means for implementing any other functionality or features described herein.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

The methods and systems described above require no particular component or function. Thus, any described component or function—despite its advantages—is optional. Also, some or all of the described components and functions described above may be used in connection with any number of other suitable components and functions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an electronic message system in which challenge messages can be sent to purported senders of electronic messages to determine whether the purported senders appear to be persons rather than machines, the electronic message system implementing a computing device comprising a computer-readable memory including computer-executable instructions stored thereon that when executed by a processor on the computing device, causes the computing device to perform a method for delivering a self-addressed electronic message without issuing a challenge message, comprising:

storing two or more user identifier data structures associated with a particular recipient, each data structure containing:
a user identifier field to identify a particular system user,
an electronic messaging identifier field to identify a mechanism for electronically contacting the particular system user, and
an electronic messaging account type field to identify whether the electronic messaging identifier field is associated with an external account from which the electronic message system can retrieve messages or whether electronic messaging identifier field is associated with a forwarding account from which electronic messages are automatically forwarded to the electronic message system;

receiving an electronic message with a sender address and a recipient address;

accessing the two or more user identifier data structures to determine that the sender address and the recipient address are contained in the two or more user identifier data structures to conclude that the sender address and the recipient address are both associated with the recipient; and determining whether to accept delivery of the electronic message based on the relationship between the sender address and the recipient address, wherein when the sender address and the recipient address are different and the electronic messaging account type field for a particular user identifier data structure associated with the sender address indicates at least one of an external account or a forwarding account, the electronic message is delivered to the recipient address; and when the sender address and the recipient address are identical, the electronic message is subjected to an additional filtering process and delivery of the electronic message is performed, only if the additional filtering process is successfully completed.

2. A method for managing the delivery of an electronic message, the method comprising:

storing two or more user identifier data structures associated with a particular recipient, each data structure containing:

a user identifier field to identify a particular system user, an electronic messaging identifier field to identify a mechanism for electronically contacting the particular system user, and an electronic messaging account type field to identify whether the electronic messaging identifier field is associated with an external account from which the electronic message system can retrieve messages or whether electronic messaging identifier field is associated with a forwarding account from which electronic messages are automatically forwarded to the electronic message system;

at an electronic messaging system, receiving an electronic message;

receiving a sender identifier associated with the electronic message;

receiving a recipient identifier associated with the electronic message; and determining whether to issue a challenge-response process comprising accessing at least one user identifier data structure to determine that the sender identifier and the recipient identifier indicate that the electronic message is a self-addressed electronic message and determining that any of the following exists:

when the recipient identifier is a primary recipient identifier and the sender identifier is associated with an electronic messaging account type field indicating an external account from which electronic messages may be retrieved by the electronic messaging system, then sending the electronic message to an inbox associated with the recipient identifier without issuing a challenge-response process;

when the recipient identifier is a primary recipient identifier and the sender identifier is associated with an electronic messaging account type field indicating a forwarding account from which electronic messages may be automatically sent to the electronic messaging system, then sending the electronic message to an inbox associated with the recipient identifier without issuing a challenge-response process;

when the recipient identifier is a secondary recipient identifier and the sender identifier is associated with an electronic messaging account type field indicating an external account from which electronic messages may be retrieved by the electronic messaging system, then sending the electronic message to an inbox associated with the recipient identifier without issuing a challenge-response process;

when the recipient identifier is a secondary recipient identifier and the sender identifier is associated with an electronic messaging account type field indicating a forwarding account from which electronic messages may be automatically sent to the electronic messaging system, then sending the electronic message to an inbox associated with the recipient identifier without issuing a challenge-response process;

when the recipient identifier is associated with an electronic messaging account type field indicating an external account from which electronic messages may be retrieved by the electronic messaging system, and the sender identifier is at least one of 1) a primary recipient identifier, 2) a secondary recipient identifier, 3) a derived recipient identifier, 4) associated with an external account from which electronic messages may be retrieved by the electronic messaging system, or 5) associated with a forwarding account from which electronic messages may be automatically sent to the electronic messaging system, then sending the electronic message to an inbox associated with the recipient identifier without issuing a challenge-response process; and when the recipient identifier is associated with an electronic messaging account type field indicating a forwarding account from which electronic messages may be automatically sent to the electronic messaging system, and the sender identifier is at least one 1) a primary recipient identifier, 2) a secondary recipient identifier, 3) a derived recipient identifier, 4) associated with an external account from which electronic messages may be retrieved by the electronic messaging system, or 5) associated with a forwarding account from which electronic messages may be automatically sent to the electronic messaging system, then sending the electronic message to an inbox associated with the recipient identifier without issuing a challenge-response process.

3. The method of claim 2, wherein at least one of the sender identifier and the recipient identifier is received within a portion of the electronic message.

4. The method of claim 2, wherein at least one of the sender identifier and the recipient identifier is received using a electronic message protocol.

5. The method of claim 2, wherein determining whether the sender identifier and the recipient identifier indicate that the electronic message is self-addressed comprises:

determining whether the recipient identifier is a derived recipient identifier.

6. The method of claim 2, wherein determining whether the sender identifier and the recipient identifier indicate that the electronic message is self-addressed comprises:

determining whether the sender identifier is the same as the recipient identifier.

* * * * *

UNITED STATES PATENT AND TRADEMARK OFFICE
CERTIFICATE OF CORRECTION

PATENT NO. : 7,627,635 B1  Page 1 of 1
APPLICATION NO. : 10/900657
DATED : December 1, 2009
INVENTOR(S) : Logue et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1058 days.

Signed and Sealed this

Second Day of November, 2010

David J. Kappos
*Director of the United States Patent and Trademark Office*